United States Patent [19]
Tadokoro et al.

[11] 3,928,159
[45] Dec. 23, 1975

[54] METHOD FOR FORMING PROTECTIVE FILM BY IONIC PLATING

[75] Inventors: Eiichi Tadokoro; Tatsuji Kitamoto, both of Kanagawa, Japan

[73] Assignee: Fuji Photo Film Co., Ltd., Kanagawa, Japan

[22] Filed: Sept. 4, 1974

[21] Appl. No.: 503,125

[30] Foreign Application Priority Data

Sept. 4, 1973 Japan ................ 48-99642

[52] U.S. Cl. .............. 204/192; 117/239; 340/174 R
[51] Int. Cl.[2] ...................... C23C 15/00; C11B 5/00
[58] Field of Search ............ 204/192, 298; 117/239, 117/240; 340/174 R

[56] References Cited

UNITED STATES PATENTS

| | | | |
|---|---|---|---|
| 3,498,837 | 3/1970 | Alstad et al. | 117/239 |
| 3,516,860 | 6/1970 | Simmons | 117/236 |
| 3,531,322 | 9/1970 | Kefalas et al. | 117/236 |
| 3,674,554 | 7/1972 | Patel et al. | 117/237 |
| 3,767,369 | 10/1973 | Barlow et al. | 29/194 |
| 3,772,174 | 11/1973 | Spalvins | 204/192 |
| 3,829,372 | 8/1974 | Heller | 204/192 |

*Primary Examiner*—John H. Mack
*Assistant Examiner*—Aaron Weisstuch
*Attorney, Agent, or Firm*—Sughrue, Rothwell, Mion, Zinn & Macpeak

[57] ABSTRACT

In a method for formation of a protective film on a magnetic recording substance by ionic plating comprising generating a glow discharge of nitrogen or an inert gas at a vacuum of from about $1 \times 10^{-1}$ mmHg to $1 \times 10^{-5}$ mmHg between a magnetic recording substance as a substrate and at least one metal selected from the group consisting of the Group IB, Group IIB, Group VIB, Group VIIB and Group VIIIB metals as the evaporative source, and applying a voltage to the substrate and the evaporative source so that the electric potential of the substrate is more negative than the electric potential of the evaporative source.

7 Claims, No Drawings

METHOD FOR FORMING PROTECTIVE FILM BY IONIC PLATING

BACKGROUND OF THE INVENTION

1. Field of the Invention

This invention relates to a method for formation of a protective layer on a magnetic recording medium by ionic plating.

2. Description of the Prior Art

Ionic plating is a method for formation of a film on a substrate where a voltage is imparted between the substrate to be plated and a film forming metal in an inert gas atmosphere of a high vacuum so as to make the electric potential of the substrate more negative than that of the film forming metal, and thereafter the film forming metal is melted and vaporized to form a film on the substrate.

Materials having complicated shapes can be relatively evenly plated in the ionic plating method, and ionic plating is free of environmental pollution problems due to waste liquids, since it is different from other conventional plating methods. Thus, recently attention has been directed toward ionic plating. Ionic plating is actually adapted to various fields such as gold plating of metal articles for the purpose of improving the erosion resistance and appearance thereof and imparting lubrication in vacuum thereto.

On the other hand, magnetic discs and magnetic drums are important memory units in electronic computers, since they have a short access time, and these are very important as recording and reproducing media for recording rapid motion in slow motion. These magnetic discs and magnetic drums have excellent characteristics, rapid progress has been made recently in improving them, and those having high recording density have now been manufactured. In general, these magnetic discs and drums are manufactured by providing a magnetic film on a non-magnetic support.

Plastics such as acrylonitrile-butadiene-styrene ternary copolymers, polyethylene terephthalate and polycarbonates, and non-magnetic metals such as aluminum alloys, copper and copper alloys are used as a non-magnetic substrate.

The magnetic film is formed on the substrate, for example, by conventional electro-plating or evaporation plating, and the magnetic film is made of metals, for example, ferromagnetic metals such as Fe, Co, Ni and the like or ferromagnetic alloys such as Fe-Co, Fe-Ni, Co-Ni, Fe-Rh, Co-P, Co-B, Co-Y, Co-La, Co-Ce, Co-Pr, Co-Sm-Co-Pt, Co-Mn, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W, Co-Ni-Mo and Co-Ni-Re.

It is possible to manufacture magnetic drums and magnetic discs of large capacity by combining a number of the above described non-magnetic substrates and magnetic metal films, and these magnetic discs and drums are especially noted as magnetic memory units having excellent characteristics (for example, as described in Japanese Patent Laid-Open Publication No. 45716/72 and U.S. Pat. No. 2,643,331). In addition, magnetic discs have been recently adapted to frame memory in video recording and slow-motion video recording by modification of the time axis. In these magnetic discs and drums of non-magnetic substrates and magnetic films, hard and durable protective films are provided to prevent the magnetic films from being damaged due to repeated recording and reproduction.

These protective films must necessarily be sufficiently resistant to scratching, shock, dust and like external forces.

Accordingly, a uniform, hard and durable protective layer which is in total thinner than the minimum length (in general thinner than about 0.5 to 2 $\mu$) of recording must be provided on a magnetic layer. When brought into contact with a magnetic head of Permalloy, ferrite or the like at a high speed of about 10 to 40 m/sec, the protective film must be completely durable to shock and must be able to protect the magnetic layer. For this, formation of a mirror surface such as a metal (rhodium) plated surface on the magnetic layer by electroplating is effective. However a rhodium plated surface is somewhat defective in that the plated surface tends to become rough, this roughness arising from small holes due to the effect of the under-plated base layer and hydrogen gas generated during the plating of rhodium. The magnetic head often catches in holes or the like when passing on the rough surface and damages, after repetition, the protective layer in the running direction of the head (or in the direction opposite to the direction of rotation of the disc).

Electroplating and evaporation plating are typical embodiments for formation of protective films, but these methods are quite unsatisfactory, including additional defects as described below, in addition to the above described drawbacks.

Both magnetic drums and discs require protective films which have similar properties and which are formed in a similar manner, and the following explanation is made with respect to a magnetic disc.

The formation of the protective film by plating is carried out as follows.

After a magnetic layer of Co-P, Co-Ni-P or the like is plated on an aluminum alloy or a copper alloy, one or a plurality of protective layers is plated by chromium plating, rhodium plating, nickel-tin alloy plating, nickel-phosphorus plating, osmium plating, rhenium plating and/or ruthenium plating, for example, as disclosed in Japanese Patent Publication No. 49603/72 and U.S. Pat. Nos. 3,417,389 and 3,607,460.

In the above plating, metal ions are dissolved in a plating bath, and the magnetic layer of the magnetic disc is plated with the metals by electro-plating.

Protective films formed by this plating have the following defects.

1. The protective layer is easily affected by the activation of the surface of the magnetic layer, and the adhesion between the magnetic layer and the protective film is poor.
2. The thickness of the protective layer plated is often uneven, because the layer is formed by electroplating.
3. A much larger amount of metals must be put in a plating bath than the amount of metals to be actually plated, and so the cost in producing the plating bath is extremely high when expensive metals are used.
4. The plating bath must always be controlled with the lapse of time.
5. The surface of the protective film plated is hardly uniform.

On the other hand, protective films formed by evaporation plating also have the following defects.

1. Adhesion with the base magnetic film is extremely poor.

2. The surface of the magnetic film must necessarily be kept extremely clean.

As explained above, all protective films obtained by electro-plating or evaporation plating have various defects, and they are not satisfactory as protective films for magnetic discs. The formation of protective films has been extensively studied and it has been found that protective films formed by ionic plating are extremely excellent and that these films are free from all of the defects present with protective films formed by electroplating or evaporation plating, having a practically useful durability.

SUMMARY OF THE INVENTION

An object of this invention is to provide an economical method for formation of an even protective film on a magnetic recording substance having good adhesion with the substrate.

More precisely, this invention provides a method for formation of a protective layer on a magnetic recording substance by ionic plating comprising generating a glow discharge of nitrogen or an inert gas at a vacuum of from about and an evaporative $1 \times 10^{-1}$ mmHg to $1 \times 10^{-5}$ mmHg between a magnetic recording substance as a substrate and at least one metal selected from the group consisting of Group IB, Group IIB, Group VIB, Group VIIB and Group VIIIB metals as the evaporative source, and applying a voltage to the substrate and the evaporative source so that the electric potential of the substrate is more negative than the electric potential the evaporative source.

DETAILED DESCRIPTION OF THE INVENTION

The magnetic recording layer of the magnetic recording material which is the substrate in the method of this invention is a ferromagnetic metal or metal alloy thin film formed by conventional electro-plating or evaporation plating, containing at least one metal of Fe, Co and Ni. Representative examples of the ferromagnetic layer are ferromagnetic metal or metal alloy thin layers of Fe, Co, Ni, Fe-Co, Fe-Ni, Co-Ni, Fe-Co-Ni-Re-Rh, Co-P, Co-B, Co-Y, Co-La, Co-Ce, Co-Pr, Co-Sm, Co-Pt, Co-Mn, Co-Ni-P, Co-Ni-B, Co-Ni-B, Co-Ni-Ag, Co-Ni-Nd, Co-Ni-Ce, Co-Ni-Zn, Co-Ni-Cu, Co-Ni-W, Co-Ni-Mo and Co-Ni-Re, with Co-P and Co-Ni-P being preferred.

Metals for the evaporative source in the method of this invention are non-magnetic metals of Group IB, Group IIB, Group VIB, Group VIIB, and Group VIIIB, such as Cu, Ag, Au; Zn; Cr, Mo, W; Mn, Tc, Re, Ru, Rh, Pd, Os, Ir and Pt.

These metals can be used alone as the evaporative source in ionic plating, or alternatively, a plurality of evaporative sources of these metals can be provided whereby all of the metals are simultaneously evaporated while appropriately changing the applied potential to form a metal alloy film by ionic plating.

In addition, it is effective to intermittently plate the same or different metals for the purpose of avoiding heating the underplated layer.

The degree of vacuum or the pressure of the nitrogen gas or inert gas atmosphere essentially ranges from about $1 \times 10^{-1}$ mmHg to $1 \times 10^{-5}$ mmHg in the method of this invention, which is important in the performance of ionic plating. When the degree of vacuum is lower than $10^{-5}$ mmHg, this almost corresponds to the degree of vacuum in conventional evaporation plating. On the other hand, when the pressure is higher, falling in the range of $10^0$ mmHg (or 1 mmHg) to $10^1$ mmHg, performance of the glow discharge is poor and the efficiency in ionic plating is reduced, causing formation of poor quality thin films having powdery coarse surfaces. These films have extremely poor adhesion to the substrate. Accordingly, it is to be noted that the above specified range for the degree of vacuum of the inert gas atmosphere is indispensably essential in the method of this invention, and the present method is in fact ineffective when the degree of vacuum in ionic plating falls outside this range.

In the method of this invention, the potential difference between the magnetic recording substance (negative substrate) and the metal component (positive evaporative source) is obtained by applying a direct current voltage of about 0.5 kV to 5 kV therebetween.

The thickness of the protective film provided on the magnetic recording substrate in general ranges from about 0.05 $\mu$ to 2 $\mu$, and the ionic plating is carried out for about 5 to 180 seconds under the above-described conditions for forming a protective film having this thickness.

In the ionic plating method of this invention, the above-described metals are melted and vaporized in a nitrogen gas or an inert gas (such as helium, neon, argon, krypton, xenon or radon) atmosphere, in the same manner as in conventional evaporation plating, as already explained above. The melting and vaporization temperatures will of course differ depending on the metals employed, but in general can range from about the melting point to the boiling point, more generally from the melting point to about 150°C above the melting point. Temperatures of about 1000°C to 2000°C can be employed but can vary depending on the specific metal being used. In contrast to conventional evaporation plating, however, a direct current electric field is applied between the substrate and the evaporative soure (metal components to be melted and vaporized) in the ionic plating of this invention, and therefore, the vaporized metals are ionized to be able to penetrate the surface of the magnetic recording substance grounded to a substrate, having a high energy. Accordingly, an extremely strong adhesion can be attained between the plated metal layer and the substrate in the ionic plating of this invention, as compared with the conventional evaporation plating. The surface of the substrate to be plated by ionic plating can be fully cleaned by previously performing the glow discharge for about 10 to 20 minutes, prior to the ionic plating, in the same nitrogen gas or inert gas atmosphere where the pressure thereof is adjusted to about $1 \times 10^{-1}$ mmHg to $1 \times 10^{-3}$ mmHg, without any other different pretreatment for cleaning the surface of the substrate being required.

The ionic plating is carried out in the same manner as conventional evaporation plating, and therefore, the thickness of the protective film formed is extremely uniform, the surface thereof being substantially smooth, in contrast to the protective film formed by electroplating. With respect to the amount of metal used for ionic plating in this invention, an extremely small amount of metal placed on a evaporation boat is sufficient and thus the protective film can be formed with a very small amount of metal, which is different from electroplating requiring a large amount of the metal. In addition, the ionic plating of this invention is carried out in a nitrogen or an inert gas atmosphere which is not under an extremely high degree of vacuum and therefore the operation efficiency of the method is good and stable and reproducible protective films can be obtained.

In addition, it is possible to control the size of the particles of film forming metals to be plated by ionic plating, by appropriately controlling the respective partial pressure of the inert gas present and therefore, the color of the film formed is free from metallic brilliance, being black in color, and adhesion of the film to the base substrate is quite strong. When a magnetic disc having a protective metal film as plated by the ionic plating method of the present invention was tested for practical use, using a video disc recorder, the protective film was observed to be extremely stable and capable of improving the durability of the magnetic layer.

The magnetic recording substance having a protective film layer formed by the ionic plating in the present invention has a maximum magnetic flux density (Bm) of about 10,000 to 15,000 G, a residual magnetic flux density (Br) of about 6,000 to 10,000 G, and a coercive force (Hc) of about 300 to 600 Oe. These characteristics are almost the same as those of a magnetic recording substance without a protective film layer.

The protective film formed by ionic plating in the method of this invention is free from the defects of other protective films formed by electroplating or evaporation plating, and have superior characteristics to the latter.

This invention is explained in greater detail in the following Examples and Comparative Examples. One skilled in the art can easily understand that the components, the proportions thereof, and the order of steps can optionally be varied as long as they do not overstep the scope of this invention. Accordingly, this invention is not to be construed as being limited to only the illustrated Examples. Unless otherwise indicated, all parts, percents, ratios and the like are by weight.

COMPARATIVE EXAMPLE 1

Using an aluminum alloy plate (A,A7075), a disc (outer diameter: 10 cm, inner diameter: 3 cm, thickness: 5 mm) was prepared. After the surface of the disc was roughened by mechanical processing to a degree of 0.1 S or less (surface roughness, JIS B0601 1970), the thus roughened surface was completely cleaned. Afterwards, the surface was plated in the order of a zinc substitution plating and a copper sulfate plating. The thus pretreated surface was plated with a magnetic plating of the Co-Ni-Cu system comprising the following components. The thickness of the plated magnetic layer was 0.2 μ.

| | | |
|---|---|---|
| Cobalt Sulfate.$7H_2O$ | 40 | g/liter |
| Cobalt Chloride.$6H_2O$ | 5 | g/liter |
| Nickel Sulfate.$7H_2O$ | 40 | g/liter |
| Nickel Chloride.$6H_2O$ | 5 | g/liter |
| Formalin | 3 | cc/liter |
| Copper Sulfate.$5H_2O$ | 0.13 | g/liter |
| 1,5-Naphthalene-disulfonic Acid | 0.2 | g/liter |
| Boric Acid | 20 | g/liter |
| Water to make | 1 | liter |

The magnetic disc thus manufactured had the following magnetic characteristics: Bm = 12,000 T; Br = 8,500 G; Hc = 450 Oe.

Next, a protective layer having a thickness of 0.22 μ was provided on the surface of the plated magnetic layer of this magnetic disc, using a rhodium plating bath containing the following components:

| | | |
|---|---|---|
| Rhodium Sulfate | 15 | g/liter |
| Sulfuric Acid | 5 | cc/liter |
| Water to make | 1 | liter |

A life test of the protective layer of the thus produced magnetic disc was carried out by driving the disc.

The life test was conducted as follows:

A ferrite head was fixed under pressure on the magnetic disc at a distance of 9 cm from the center of the disc, and the disc was rotated at a speed of 1,800 r.p.m. whereupon a signal of 4 MHz was recorded and continuously reproduced. The test was continuously carried out until the output became zero, and the elapsed time was taken as the life of the disc. In this test, the disc driving was carried out in a clean room (class 100, i.e., having less than 100 particles having a 2 micron size per cubic foot) to eliminate external dust.

As a result, the life of the rhodium protective layer tested was 873 hours.

COMPARATIVE EXAMPLE 2

On the surface of a disc which was pre-treated in the same manner as in Comparative Example 1, a magnetic layer having a thickness of 0.2 μ was plated using a magnetic plating bath containing the following components:

| | | |
|---|---|---|
| Nickel Sulfate.$7H_2O$ | 300 | g/liter |
| Nickel Chloride.$6H_2O$ | 100 | g/liter |
| Boric Acid | 50 | g/liter |
| Hypophosphorous Acid | 20 | g/liter |
| Water to make | 1 | liter |

On the thus plated magnetic layer was further plated a rhenium protective film having a thickness of 0.22 μ, using a plating bath containing the following components:

| | |
|---|---|
| Rhenium Sulfate | 15 g/liter |
| Sulfuric Acid | 20cc |
| Water to make | 1 liter |

A life test was carried out in the same manner as in Comparative Example 1, and the life of the rhenium protective film formed by plating was 420 hours.

COMPARATIVE EXAMPLE 3

On the surface of a plated magnetic layer of a magnetic disc which was treated in the same manner as in Comparative Example 1 was provided a chromium protective film having a thickness of 0.22 μ by vacuum evaporation plating where the degree of vacuum was $1.8 \times 10^{-5}$ mmHg and the temperature of the disc was 26°C.

The life test was carried out in the same manner as in Comparative Example 1 whereby the output was lost in several minutes. This was because of the poor adhesion between the chromium protective film plated by evaporation plating and the underplated magnetic layer.

EXAMPLE 1

On the surface of a plated magnetic layer of a magnetic disc which was treated in the same manner as in Comparative Example 1 was provided a rhodium or chromium protective film by ionic plating. The sample having the rhodium protective film was designated Sample No. I-1 and the sample having the chromium protective film was designated Sample No. I-2.

The ionic plating was carried out as follows:

Argon gas of high purity was previously fed into the system little by little, to produce an argon gas atmosphere at a vacuum of $1.2 \times 10^{-2}$ mmHg, and the magnetic disc was disposed as a negative pole and the evaporative metal (rhodium or chromium) as a positive pole with a distance of 15 cm between the two poles. A direct current voltage of 1.5 kV was applied between these two poles to carry out the glow discharge therebetween and the ionic plating was continued until a protective film having a thickness of 0.22 $\mu$ was formed. The time of ionic plating was about 15–20 seconds.

A life test was carried out on the two Samples I-1 and I-2 thus obtained in the same manner as in Comparative Example 1, and the results obtained are as follows:

Table 1

| Sample | Evaporative Metal | Life Test |
|---|---|---|
| I-1 | Rh | About 2800 hours |
| I-2 | Cr | About 1700 hours |

The magnetic characteristics of the magnetic disc having the above protective film were as follows: Bm = 12,000 G, Br = 8,500 G, Hc : 450 Oe. These characteristics are same as those of the magnetic disc of Comparative Example 1 before being plated with the rhodium protective layer. Thus, the protective films formed by ionic plating were confirmed to not affect the magnetic characteristics of the magnetic disc. In addition, it is apparent that the results of this Example are superior to those of Comparative Examples 1, 2 and 3.

In this Example 1, however, the surface of the film formed by ionic plating on the magnetic disc was partly uneven, and the brilliance was different in some places on the surface of the magnetic disc and some parts peeled off in an adhesion test using a cellophane adhesive tape.

EXAMPLE 2

On the surface of a plated magnetic layer of a magnetic disc which was treated in the same manner as in Comparative Example 1 was provided a rhodium, chromium, molybdenum, tungsten, rhenium or osmium protective film by ionic plating. These samples were designated Sample No. II-1, Sample No. II-2, Sample No. II-3, Sample No. II-4, Sample No. II-5 and Sample No. II-6, respectively.

The ionic plating was carried out as follows:

Argon gas of high purity was previously fed into the system little by little, to produce an argon gas atmosphere of a vacuum of $1.2 \times 10^{-2}$ mmHg, and the magnetic disc was disposed as a negative pole and the boat for the evaporative metal as a positive pole with a distance of 15 cm between the two poles. Before putting the evaporative metal on the boat, a direct current voltage of 1 kV was applied between the two poles to carry out a glow discharge therebetween for 5 minutes. This treatment was carried out for the purpose of cleaning the surface of the underplated magnetic layer.

After the cleaning treatment, the evaporative metal (rhodium, chromium, molybdenum, tungsten, rhenium or osmium) was put on the boat, and a direct current voltage of 1.5 kV was applied betwee the two poles to carry out a glow discharge therebetween. The ionic plating was continued until a protective film having a thickness of 0.22 $\mu$ was formed, and the time of ionic plating was about 15 to 25 seconds.

Life tests were carried out on the thus obtained Samples II-1, II-2, II-3, II-4, II-5 and II-6 in the same manner as in Comparative Example 1, and the results obtained are as follows:

Table 2

| Sample | Evaporative Metal | Life Test |
|---|---|---|
| II-1 | Rh | 5000 hours or more |
| II-2 | Cr | About 4000 hours |
| II-3 | Mo | About 1800 hours |
| II-4 | W | About 2000 hours |
| II-5 | Re | About 4300 hours |
| II-6 | Os | About 2300 hours |

The rate of the ionic plating in this Example was 1000 A/sec to 3000 A/sec.

The magnetic characteristics of the magnetic disc having the respective protective films were same as those of the magnetic disc of Comparative Example 1 before being plated with the rhodium protective layer. Thus, the protective films formed by ionic plating in this Example 2 were confirmed to not affect the magnetic characteristics of the magnetic disc.

In this Example 2, the surface of the respective protective film formed by ionic plating on the magnetic disc was quite even, and the film did not peel off in the same cellophane tape adhesion test described in Example 1.

Comparing the results of Example 1 with those of Example 2, the performance of glow discharge in the same system where the evaporative metal was not placed on the boat, prior to the ionic plating, was confirmed to be effective for cleaning the surface of the underplated magnetic layer, and the adhesion of the protective layer thereafter plated by ionic plating to this magnetic layer is thereby improved.

In addition, the results of these Examples also confirm that the protective films formed by the ionic plating according to the method of this invention are superior to those formed by other conventional plating methods. Although it might appear that the applied voltage and the pressure of nitrogen gas or inert gas in the ionic plating would remarkably affect the adhesiveness of the protective film plated to the magnetic layer, in fact no material difference was observed in the results of other life test experiments. With respect to the applied voltage, when the voltage is in the range of 300 to 400 V or more the life of the protective layer plated is not materially different as long as the distance between the sample and the evaporative metal source is appropriate.

Although this is not completely clear, the reason why the protective layer formed by ionic plating is effective for improving the life thereof is believed as follows. The adhesion of the protective layer formed by ionic plating to the underplated magnetic layer is high, which is different from the protective layers formed by other electroplating or evaporation plating. This is believed to be because in the ionic plating method the particles of evaporated metals are charged positively and strongly attracted by the high negative voltage applied to the substrate to be plated, that is, the force to impinge the positive-charged particles into the surface of the negative-charged substance is high. The metal particles for forming the protective layer do not plunge into the negative substrate one atom at a time, but a number of atoms of the metal aggregate in the gas phase due to collision with the inert gas of low pressure to become aggregated fine particles and these are deposited on the surface of the substrate whereby the thus deposited surface is not extremely microscopically even. Thus, the microscopic uneveness of the surface rather results in an extreme increase in the number of points to be contacted with the head thereby to reduce the load per contact point, and in the breakdown of the protective layer, the plated metal tends to be removed in aggregated fine particle units. On these grounds, the improvement in the increase of the life of the protective layer can thus be practically attained.

While the invention has been described in detail and with reference to specific embodiments thereof, it will be apparent to one skilled in the art that various changes and modifications can be made therein without departing from the spirit and scope thereof.

What is claimed is:

1. A method for formation of a protective layer on a magnetic recording substance by ionic plating comprising generating a glow discharge of nitrogen gas or an inert gas at a vacuum of about $1 \times 10^{-1}$ to about $1 \times 10^{-5}$ mmHg between a magnetic recording substance as a substrate and at least one metal selected from the group consisting of Group IB, Group IIB, Group VIB, Group VIIB and Group VIIIB metals as an evaporative source and applying a voltage so that the electric potential of said substrate is more negative than the electric potential of said evaporative source.

2. The method as claimed in claim 1, including cleaning the surface of the magnetic recording substance to be plated by ionic plating by carrying out the glow discharge in a nitrogen gas or an inert gas atmosphere having a pressure of about $1 \times 10^{-1}$ mmHg to $1 \times 10^{-3}$ mmHg for 10 to 20 minutes prior to the ionic plating of the protective film.

3. The method as claimed in claim 1, wherein said evaporative metal is at least one metal selected from the group consisting of Cu, Ag, Au, Zn, Cr, Mo, W, Mn, Tc, Re, Ru, Rh, Pd, Os, Ir, and Pt.

4. The method as claimed in claim 1, wherein the inert gas is at least one gas selected from the group consisting of helium, neon, argon, krypton, xenon and radon.

5. The method as claimed in claim 1, wherein the applied voltage is a direct current voltage of about 0.5 kV to 5 kV.

6. The method as claimed in claim 1, wherein the ionic plating is for about 5 to 180 seconds.

7. The method as claimed in claim 1, wherein the thickness of the protective film ranges from about 0.05 to 2 $\mu$.

* * * * *